(12) United States Patent
Murase et al.

(10) Patent No.: US 12,466,308 B2
(45) Date of Patent: Nov. 11, 2025

(54) VEHICLE HEADLIGHT SYSTEM, DISPLAY CONTROL METHOD FOR VEHICLE HEADLIGHT SYSTEM, AND NON-TRANSITORY STORAGE MEDIUM

(71) Applicant: TOYOTA JIDOSHA KABUSHIKI KAISHA, Toyota (JP)

(72) Inventors: Yukimi Murase, Toyota (JP); Sho Masuda, Toyota (JP); Tetsuya Ikuta, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 334 days.

(21) Appl. No.: 18/365,641

(22) Filed: Aug. 4, 2023

(65) Prior Publication Data

US 2024/0101017 A1  Mar. 28, 2024

(30) Foreign Application Priority Data

Sep. 22, 2022  (JP) .................................. 2022-151903

(51) Int. Cl.
*B60Q 1/08* (2006.01)
*B60K 35/28* (2024.01)

(52) U.S. Cl.
CPC ................ *B60Q 1/08* (2013.01); *B60K 35/28* (2024.01); *B60K 2360/171* (2024.01)

(58) Field of Classification Search
CPC ................ B60Q 1/143; B60Q 2300/42; B60Q 2300/056; B60Q 2300/45; B60Q 2400/50; B60Q 1/085; B60Q 1/507; B60Q 2300/054; B60Q 2300/33; B60Q 2300/41; B60Q 1/543; B60Q 2400/20
See application file for complete search history.

(56) References Cited

U.S. PATENT DOCUMENTS 12,304,382 B2 * 5/2025 Imai ..................... B60Q 1/1469
2008/0101077 A1 * 5/2008 Watanabe ............ B60Q 1/1423
362/466

(Continued)

FOREIGN PATENT DOCUMENTS

JP 2022-093406 A 6/2022
WO 2012/053050 A1 4/2012

*Primary Examiner* — Wei (Victor) Y Chan
(74) *Attorney, Agent, or Firm* — Sughrue Mion, PLLC

(57) ABSTRACT

A vehicle headlight system comprises a headlight that irradiates light in front of a host vehicle, a target detection section that is configured to detect a target present in front of the host vehicle, a display that is provided inside a vehicle cabin of the host vehicle, a first memory, a first processor that is coupled to the first memory, a second memory, and a second processor that is coupled to the second memory. The first processor includes a light irradiation control function that is configured to control light distribution of the headlight, based on a detection result by the target detection section. The second processor is configured to determine whether or not the light irradiation control function is in an active state, to control a display mode of the display so as to show a determination result, and in a case in which the light irradiation control function is in the active state, to control the display mode of the display so as to show, in addition to the determination result, a light distribution control state according to the light irradiation control function.

5 Claims, 6 Drawing Sheets

(56) References Cited

U.S. PATENT DOCUMENTS

| | | | |
|---|---|---|---|
| 2008/0130302 A1* | 6/2008 | Watanabe | B60Q 1/085 |
| | | | 362/466 |
| 2008/0259619 A1* | 10/2008 | Tyll | B60Q 1/0005 |
| | | | 362/464 |
| 2013/0175926 A1 | 7/2013 | Katsuno | |
| 2020/0198561 A1* | 6/2020 | Weed | B62D 63/04 |

* cited by examiner

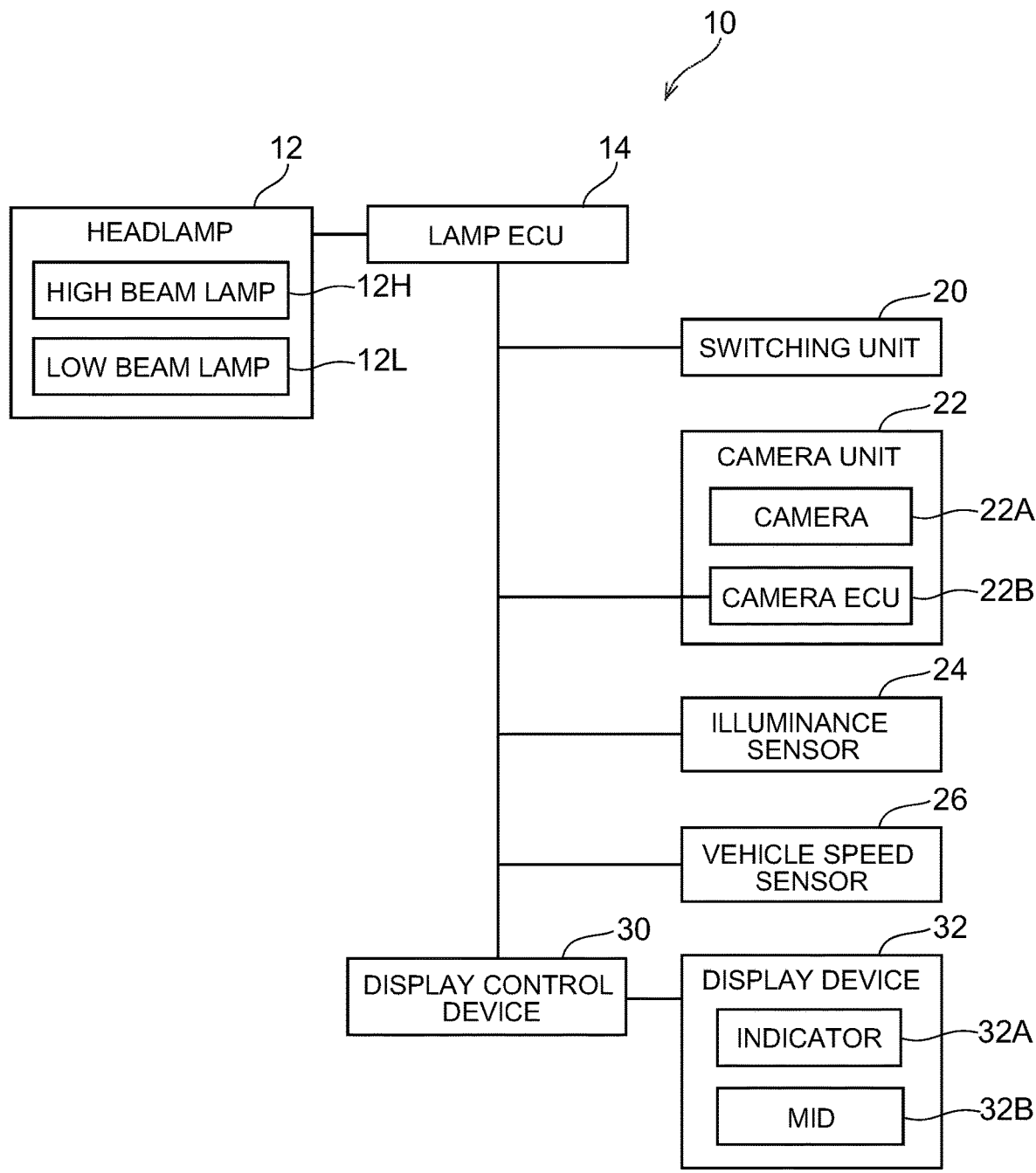

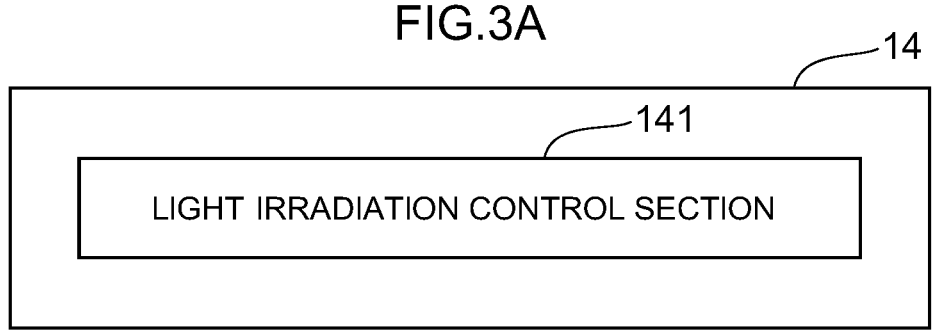
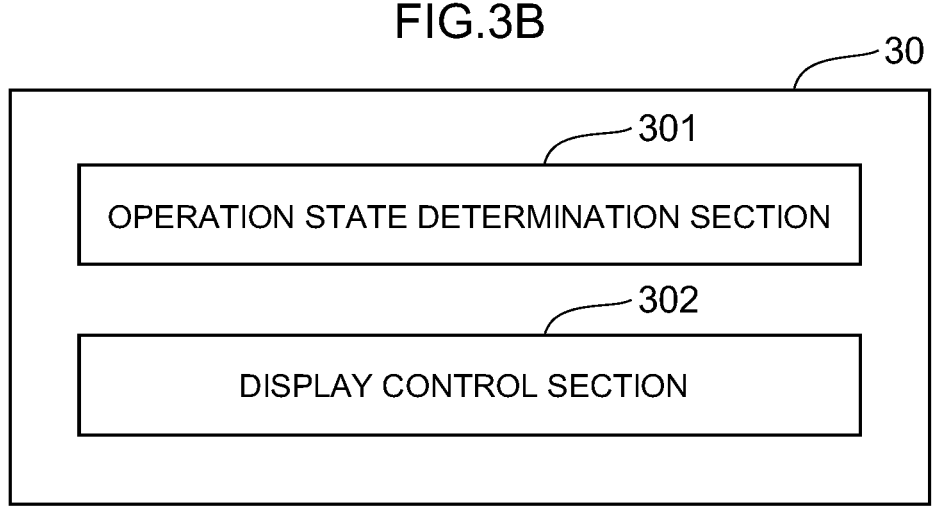

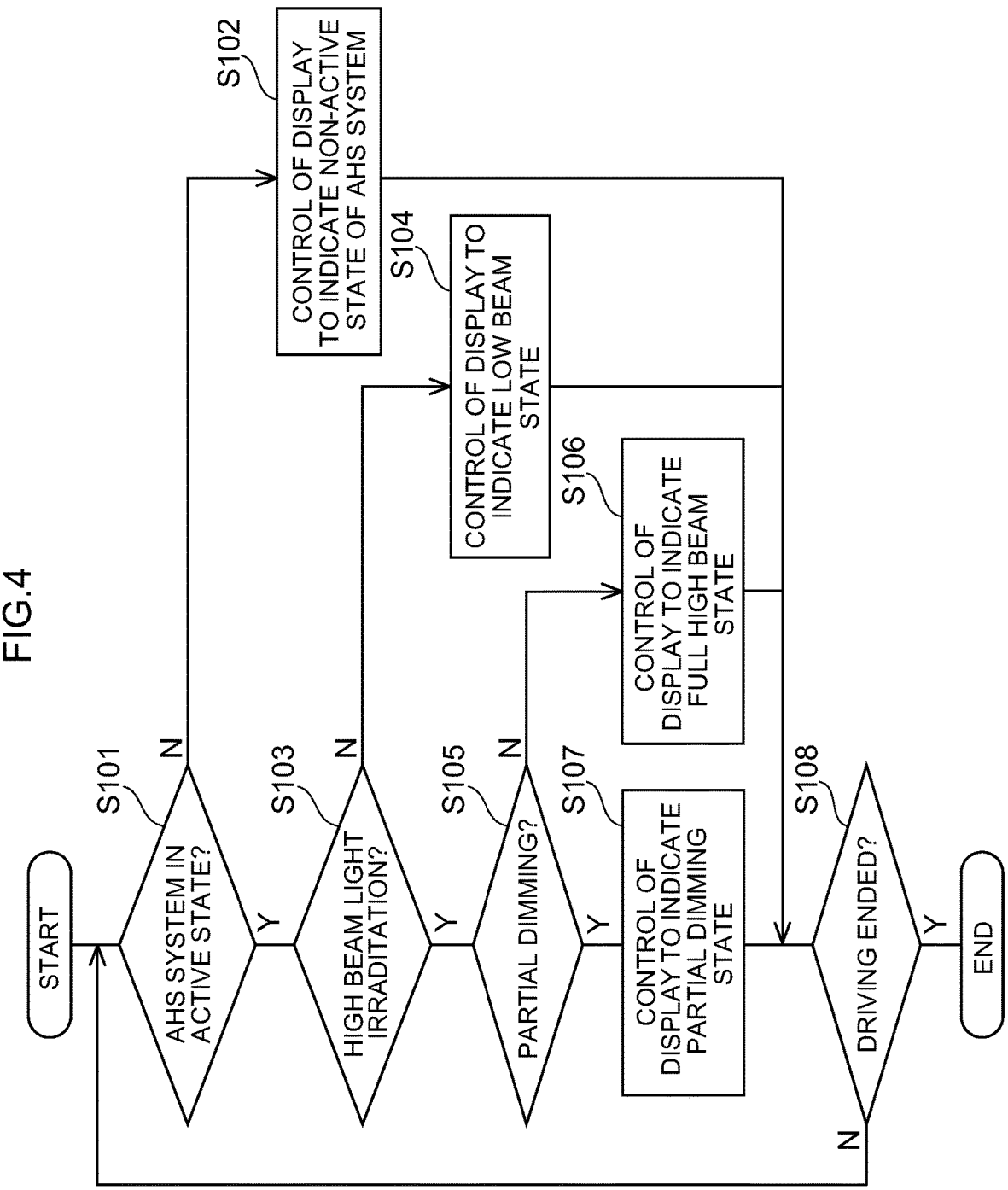

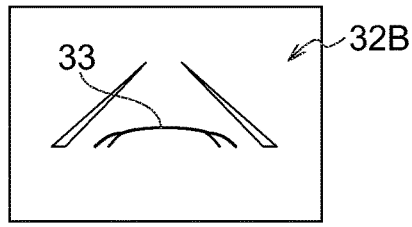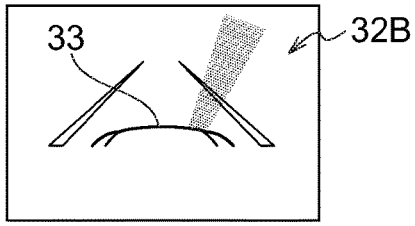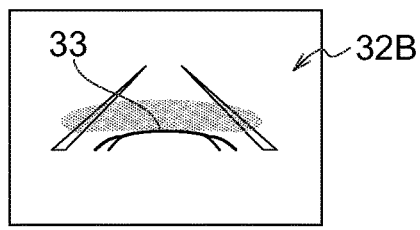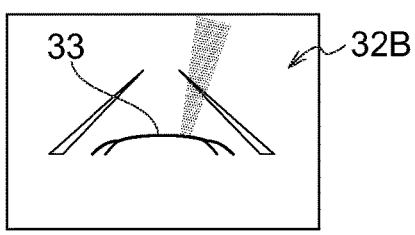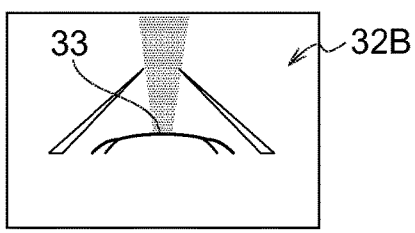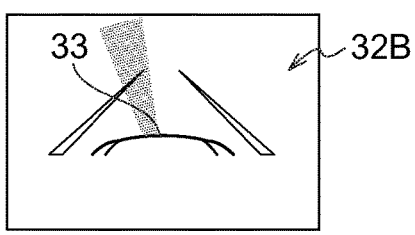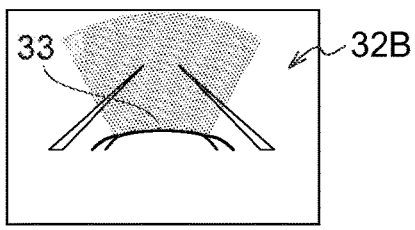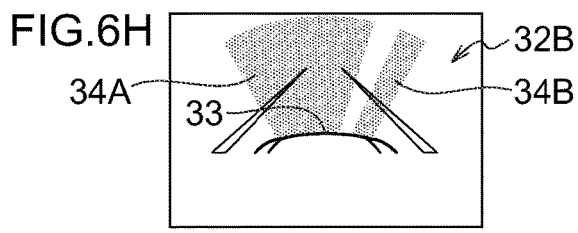

VEHICLE HEADLIGHT SYSTEM, DISPLAY CONTROL METHOD FOR VEHICLE HEADLIGHT SYSTEM, AND NON-TRANSITORY STORAGE MEDIUM

CROSS-REFERENCE TO RELATED APPLICATION

This application is based on and claims priority under 35 USC 119 from Japanese Patent Application No. 2022-151903 filed on Sep. 22, 2022, the disclosure of which is incorporated by reference herein.

BACKGROUND

Technical Field

The present disclosure relates to a vehicle headlight system, a display control method for a vehicle headlight system, and a non-transitory storage medium.

Related Art

For example, Japanese Patent Application Laid-Open (JP-A) No. 2022-93406 discloses technology relating to a vehicle display device that conveys a change in an operation state of a vehicle function to an occupant, an example of a vehicle function including functionality whereby a headlight is automatically turned on or turned off in accordance with an illumination level outside the vehicle.

Although not described in Japanese Patent Application Laid-Open (JP-A) No. 2022-93406, in recent years, vehicle headlight systems that are capable of detecting a target object present in front of a host vehicle and controlling the light distribution of the headlight based on the detection result have become widespread.

However, in state display using current vehicle headlight systems, it is not always easy for a user to accurately understand the type of light distribution control state.

SUMMARY

The present disclosure provides a vehicle headlight system, a display control method for a vehicle headlight system, and a non-transitory storage medium capable of enabling a user to accurately understand a light distribution control state.

A vehicle headlight system according to a first aspect includes: a headlight that irradiates light in front of a host vehicle; a target detection section that is configured to detect a target present in front of the host vehicle; a light irradiation control section that is configured to control light distribution of the headlight, based on a detection result by the target detection section; an operation state determination section that is configured to determine whether or not the light irradiation control section is in an active state; a display that is provided inside a vehicle cabin of the host vehicle; and a display control section that is configured to control a display mode of the display so as to show a determination result of the operation state determination section, and so as to show a light distribution control state according to the light irradiation control section in a case in which the light irradiation control section is in the active state.

According to the above-described configuration, the headlight irradiates light in front of the host vehicle, and the target detection section detects a target present in front of the host vehicle. Further, the light irradiation control section is configured to control the light distribution of the headlight based on the detection result by the target detection section, and the operation state determination section determines whether or not the light irradiation control section is in an active state.

Furthermore, a display mode of the display provided inside the vehicle cabin of the host vehicle is controlled by the display control section. More specifically, the display control section controls the display mode of the display so as to show the determination result of the operation state determination section, and so as to show the light distribution control state according to the light irradiation control section in a case in which the light irradiation control section is in the active state. This enables a user to accurately understand whether or not the light irradiation control section is in the active state, and further, enables a user to accurately understand the light distribution control state according to the light irradiation control section in a case in which the light irradiation control section is in the active state.

A vehicle headlight system according to a second aspect is the vehicle headlight system according to the first aspect, wherein: in a case in which the light irradiation control section determines that the target is a target object for which an amount of light received from the headlight should be reduced, the light irradiation control section controls light distribution of the headlight so as to cause a light irradiation region in which the target object is present to be dimmed; and the display control section controls the display mode of the display to change in accordance with whether or not the light irradiation control section is controlling light distribution of the headlight so as to cause the light irradiation region in which the target object is present to be dimmed.

Note that "dimmed" in the second aspect refers to reducing the amount of irradiated light, and also includes cases in which the amount of irradiated light is reduced to zero (the same applies to the present specification).

According to the above-described configuration, in a case in which the target detected by the target detection section is determined to be a target object for which the amount of light received from the headlight should be reduced, the light irradiation control section controls the light distribution of the headlight so as to cause the light irradiation region in which the target object is present to be dimmed. Note that the display control section controls the display mode of the display to change in accordance with whether or not the light irradiation control section is controlling the light distribution of the headlight so as to cause the light irradiation region in which the target object is present to be dimmed, thereby enabling a user to accurately understand whether or not the light irradiation region in which the target object is present is being dimmed.

A vehicle headlight system according to a third aspect is the vehicle headlight system according to the second aspect, wherein: in a case in which the light irradiation control section is controlling light distribution of the headlight so as to cause the light irradiation region in which the target object is present to be dimmed, the display control section controls the display mode of the display so as to show the region in which light is dimmed or show a region that is irradiated with light by the headlight and that is not dimmed.

According to the above-described configuration, in a case in which the light irradiation control section is controlling the light distribution of the headlight so as to cause the light irradiation region in which the target object is present to be dimmed, the display control section controls the display mode of the display so as to show the region in which light is dimmed or so as to show a region that is irradiated with light by the headlight and that is not dimmed. This enables a user to accurately understand a dimmed region.

A display control method according to a fourth aspect, for a vehicle headlight system that includes a headlight that irradiates light in front of a host vehicle, a target detection section that detects a target present in front of the host vehicle, a light irradiation control section that is configured to control light distribution of the headlight, based on a detection result by the target detection section, and a display that is provided inside a vehicle cabin of the host vehicle, includes determining whether or not the light irradiation control section is in an active state, and controlling a display mode of the display so as to show a determination result, and so as to show a light distribution control state according to the light irradiation control section in a case in which the light irradiation control section is in the active state. This enables a user to accurately understand whether or not the light irradiation control section is in the active state, similarly to the first aspect, and further enables a user to accurately understand the light distribution control state according to the light irradiation control section in a case in which the light irradiation control section is in the active state.

A display control program for a vehicle headlight system according to a fifth aspect causes a computer included in a vehicle headlight system that includes a headlight that irradiates light in front of a host vehicle, a target detection section that detects a target present in front of the host vehicle, a light irradiation control section that is configured to control light distribution of the headlight, based on a detection result by the target detection section, and a display that is provided inside a vehicle cabin of the host vehicle, to perform processing including determining whether or not the light irradiation control section is in an active state, and controlling a display mode of the display so as to show a determination result, and so as to show a light distribution control state according to the light irradiation control section in a case in which the light irradiation control section is in the active state. Accordingly, by the computer executing the display control program for a vehicle headlight system according to the fifth aspect, the display control method for a vehicle headlight system according the fourth aspect is implemented by the computer, and similarly to the invention according to the first aspect and the fourth aspect, a user can accurately understand whether or not the light irradiation control section is in an active state, and further, in a case in which the light irradiation control section is in the active state, can accurately understand the light distribution control state of the light irradiation control section.

As described above, the present disclosure has an excellent advantageous effect of enabling a user to accurately understand a light distribution control state.

BRIEF DESCRIPTION OF THE DRAWINGS

Exemplary embodiments of the present invention will be described in detail based on the following figures, wherein:

FIG. 1 is a diagram illustrating a schematic configuration of a vehicle headlight system according to an exemplary embodiment of the present disclosure;

FIG. 3A is a block diagram illustrating an example of a functional configuration of a lamp ECU;

FIG. 3B is a block diagram illustrating an example of a functional configuration of a display control device;

FIG. 4 is a flowchart illustrating an example of a flow of display control processing of a vehicle headlight system;

FIG. 6A is a diagram illustrating an example of a display using an MID;

FIG. 6B is a diagram illustrating an example of a display using an MID;

FIG. 6C is a diagram illustrating an example of a display using an MID;

FIG. 6D is a diagram illustrating an example of a display using an MID;

FIG. 6E is a diagram illustrating an example of a display using an MID;

FIG. 6F is a diagram illustrating an example of a display using an MID;

FIG. 6G is a diagram illustrating an example of a display using an MID; and

FIG. 6H is a diagram illustrating an example of a display using an MID.

DETAILED DESCRIPTION

Figure 2A:
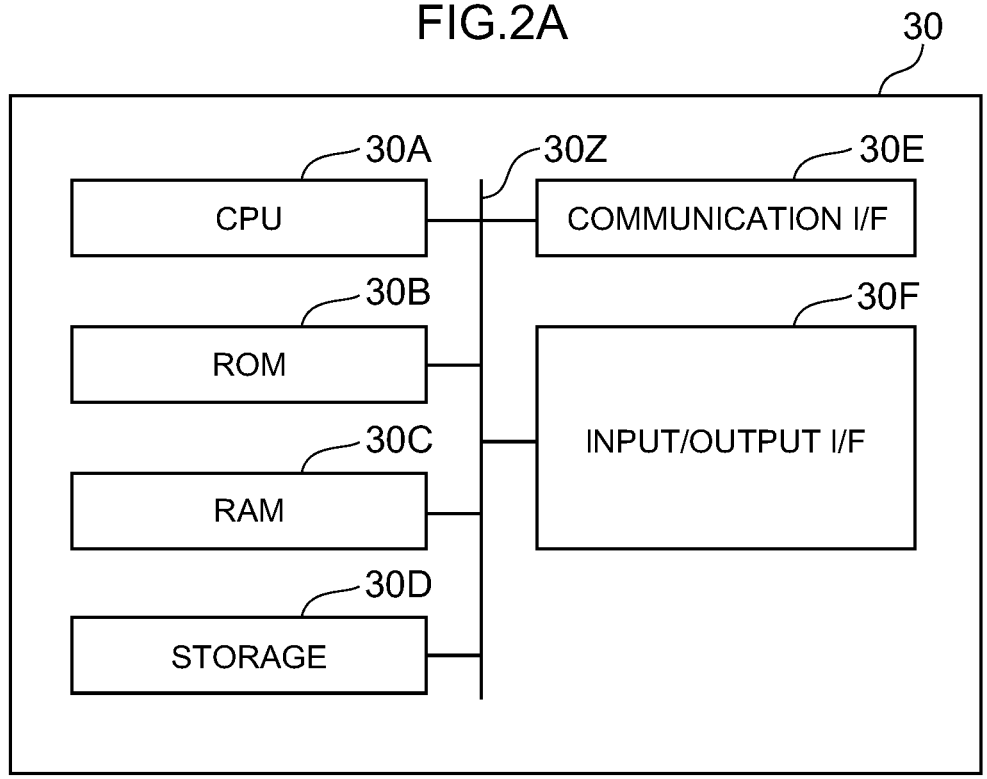
FIG. 2A is a block diagram illustrating an example of a hardware configuration of a display control device.

Explanation follows regarding an exemplary embodiment of the present disclosure, with reference to the drawings.

FIG. 1 is a diagram illustrating a schematic configuration of a vehicle headlight system 10 according to the present exemplary embodiment. The vehicle headlight system 10 includes functional configuration of a known adaptive high-beam system (AHS). An adaptive high-beam system (hereafter abbreviated to "AHS") is a system that enables light distribution of a high beam to be controlled so as not to cause glare to other vehicles ahead. Since an AHS is well-known, a detailed explanation thereof is omitted. The vehicle headlight system 10 includes a headlamp 12 serving as a headlight, a lamp ECU 14, a switching unit 20, a camera unit 22 serving as a target detection section, an illuminance sensor 24, a vehicle speed sensor 26, a display control device 30, and a display device 32 serving as a display. Note that, hereinafter, a vehicle installed with the vehicle headlight system 10 is referred to as a host vehicle.

The headlamp 12 is disposed at a front end portion of the host vehicle so as to irradiate light in front of the host vehicle, and includes a high beam lamp 12H and a low beam lamp 12L. Note that although FIG. 1 illustrates each of the high beam lamp 12H and the low beam lamp 12L as a single block, the high beam lamp 12H and the low beam lamp 12L are respectively disposed to the left and to the right of the front end portion of the vehicle. Each of the left and right high beam lamps 12H is provided with plural light sources and is configured so as to be capable of supporting an AHS.

The lamp ECU 14 is an electronic control unit (ECU) that controls the headlamp 12. The lamp ECU 14 is connected to the headlamp 12, the switching unit 20, the camera unit 22, the illuminance sensor 24, the vehicle speed sensor 26, and the display control device 30. The lamp ECU 14 is configured to implement known AHS light distribution control based on information from the switching unit 20, the camera unit 22, the illuminance sensor 24, and the vehicle speed sensor 26. Note that the AHS also includes functionality to automatically switch between turning on the low beam lamp 12L and turning on the high beam lamp 12H.

The switching unit 20 includes, for example, a lamp switch for turning on and turning off of the headlamp 12, and an AHS switch for switching on and off of the AHS. The respective switches of the switching unit 20 are operable by a driver.

The camera unit 22 includes a camera (also referred to as an "imaging device") 22A and a camera ECU 22B that is connected to the camera 22A. The camera 22A includes a lens and an imaging element, and is disposed at a position that enables in front of the host vehicle to be imaged, and captures an image of in front of the host vehicle. The camera ECU 22B detects a target present ahead of the host vehicle based on image information that is output from the camera 22A. The camera ECU 22B is connected to the lamp ECU 14 and transmits information relating to the detected target to the lamp ECU 14. Note that as an example, the camera ECU 22B is also connected to various sensors, such as a millimeter-wave radar and a LIDAR (Light Detection and Ranging/Laser Imaging Detection and Ranging), which are not illustrated, in addition to the camera 22A, and the camera ECU 22B has a function of detecting a situation ahead of the host vehicle based on information acquired from various sensors including the camera 22A.

The illuminance sensor 24 detects the illuminance in front of the host vehicle, and transmits information relating to the detected illuminance to the lamp ECU 14. The vehicle speed sensor 26 detects the vehicle speed of the host vehicle, and transmits information relating to the detected vehicle speed to the lamp ECU 14.

The display control device 30 is a computer that is connected to the display device 32 and that is capable of controlling the display device 32. Note that the display device 32 can be understood as a notification device (or a notification apparatus), and the display control device 30 can be understood as a notification control device. Control of the display device 32 by the display control device 30 is described below. The display device 32 is provided inside the vehicle cabin of the host vehicle, more specifically, at an instrument panel at a side opposite from the driver's seat, so as to be visible to an occupant of the host vehicle. The display device 32 includes an indicator (also referred to as a "tell-tale") 32A and a multi information display (MID) 32B which are provided at a meter display.

Figure 5A:
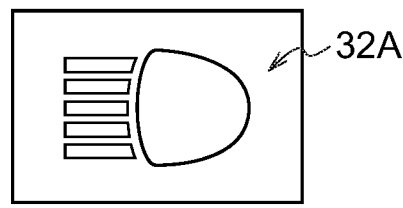
FIG. 5A is a diagram illustrating an example of a display using an indicator.
Figure 5B:
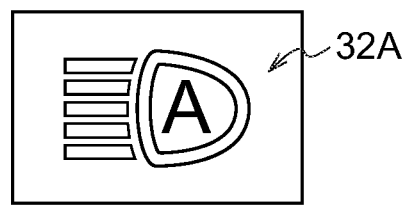
FIG. 5B is a diagram illustrating an example of a display using an indicator.
Figure 5C:
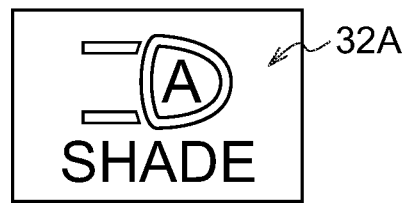
FIG. 5C is a diagram illustrating an example of a display using an indicator.
Figure 5D:
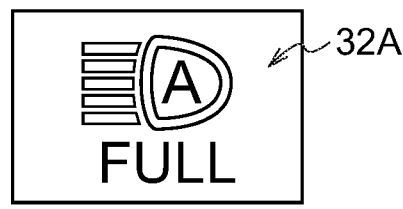
FIG. 5D is a diagram illustrating an example of a display using an indicator.

The indicator 32A includes plural small light sources, and enables display modes to be switched. As illustrated in FIG. 5A to FIG. 5D, the indicator 32A displays information relating to an operation state of the AHS and information relating to a light distribution state of the headlamp 12. The display mode illustrated in FIG. 5A illustrates a state in which the AHS is in an non-active state and a state in which the high beam lamp 12H is turned on manually, and the display mode illustrated in FIG. 5B illustrates a state in which the AHS is in an active state and the low beam lamp 12L is turned on (in other words, a state in which the high beam lamp 12H is not turned on). The display mode illustrated in FIG. 5C illustrates a state in which the AHS is in an active state and the high beam lamp 12H is irradiating a certain region with dimmed light, while the display mode illustrated in FIG. 5D illustrates a state in which the AHS is in an active state and that the high beam lamp 12H is irradiating light to all the of regions that the high beam lamp 12H is capable of irradiating light to.

The MID 32B illustrated in FIG. 1 displays light irradiation range information (light irradiation position information) and the like for the headlamp 12 in a manner illustrated in FIG. 6A to FIG. 6H, for example. Portions labeled 33 in the drawings are images of the front end portion of the host vehicle. Further, in the display modes illustrated in FIG. 6B to FIG. 6H, the portions indicated by dots are images of the regions irradiated with light. The display mode illustrated in FIG. 6A indicates a state in which the headlamp 12 is off, and the display mode illustrated in FIG. 6B indicates a state in which only the low beam lamp 12L is on. The display mode illustrated in FIG. 6C indicates a state in which the high beam lamp 12H is irradiating light to only the rightmost region, the display mode illustrated in FIG. 6D indicates a state in which the high beam lamp 12H is irradiating light to only the center-side right region, the display mode illustrated in FIG. 6E indicates a state in which the high beam lamp 12H is irradiating light to only the center region, and the display mode illustrated in FIG. 6F indicates a state in which the high beam lamp 12H is irradiating light to only the center-side left region. Further, the display mode illustrated in FIG. 6G illustrates an example of a state in which the high beam lamp 12H is irradiating light to all of the regions that can be irradiated with light, while the display mode illustrated in FIG. 6H illustrates an example of a state in which the high beam lamp 12H is irradiating a certain region with dimmed light.

A portion between the two light irradiation regions 34A and 34B that are indicated by dots in the display mode illustrated in FIG. 6H is a dimmed region. In other words, the two light irradiation regions 34A and 34B that are illustrated by the dots indicate regions in which light is being irradiated by the high beam lamp 12H and no dimming is being performed.

FIG. 2A is a block diagram illustrating an example of a hardware configuration of the display control device 30. The display control device 30 includes a central processing unit (CPU) 30A, read only memory (ROM) 30B, random access memory (RAM) 30C, storage 30D, a communication interface (abbreviated to a communication I/F in FIG. 2A) 30E, and an input/output interface (abbreviated to an input/output I/F in FIG. 2A) 30F. The CPU 30A, the ROM 30B, the RAM 30C, the storage 30D, the communication interface 30E, and the input/output interface 30F are connected so as to be capable of communicating with each other via a bus 30Z.

The CPU 30A is a central processing unit that executes various programs and controls various components. Namely, the CPU 30A serving as a second processor reads a program from the ROM 30B serving as a second memory or the storage 30D serving as a second memory, and executes the program using the RAM 30C as a workspace. The CPU 30A controls the respective configurations described above and performs a variety of computation processing in accordance with programs stored in the ROM 30B or the storage 30D.

The ROM 30B stores various programs and various data. The RAM 30C serves as a workspace to temporarily store programs and data. The storage 30D is configured by a storage device such as a hard disk drive (HDD) or a solid state drive (SSD), and stores various programs and various data. Note that in the present exemplary embodiment, the ROM 30B or the storage 30D stores a display control program configured to control the display device 32, and image data that is caused to be displayed at the display device 32, and the like.

The communication interface 30E is an interface for communicating with other devices, such as a portable terminal (not illustrated). For example, a wireless communication protocol such as 4G, 5G, or Wi-Fi (registered trademark) is used for this communication.

The input/output interface 30F is an interface for communicating with the respective devices installed at the host vehicle. The lamp ECU 14, the switching unit 20, the camera unit 22, the illuminance sensor 24, the vehicle speed sensor 26, and the display device 32 illustrated in FIG. 1 are connected to the ECU 30 of the present exemplary embodiment via the input/output interface 30F.

Figure 2B:
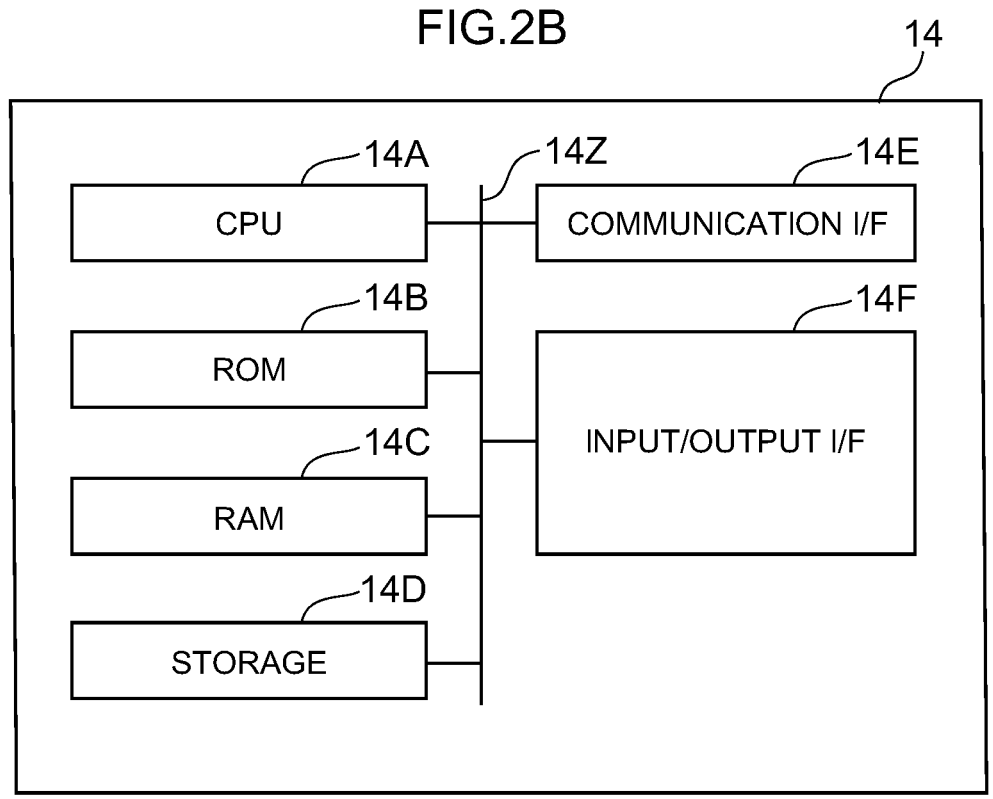
FIG. 2B is a block diagram illustrating an example of a hardware configuration of a lamp ECU.

The lamp ECU 14 and the camera ECU 22B described above also include, as an example, a CPU, ROM, RAM, storage, a communication interface, and an input/output interface. The lamp ECU 14 and the camera ECU 22B are also configured so that a CPU reads a program from the ROM or the storage, and executes the program using the RAM as a workspace to perform respective control. FIG. 2B is a block diagram illustrating an example of a hardware configuration of the lamp ECU 14. The lamp ECU 14 includes a central processing unit (CPU) 14A, read only memory (ROM) 14B, random access memory (RAM) 14C, storage 14D, a communication interface (abbreviated to a communication I/F in FIG. 2B) 14E, and an input/output interface (abbreviated to an input/output I/F in FIG. 2B) 14F. The CPU 14A, the ROM 14B, the RAM 14C, the storage 14D, the communication interface 14E, and the input/output interface 14F are connected so as to be capable of communicating with each other via a bus 14Z.

FIG. 3A is a block diagram illustrating an example of a functional configuration of the lamp ECU 14. As illustrated in FIG. 3A, the lamp ECU 14 includes a light irradiation control section 141 as a functional configuration.

In the lamp ECU 14, as illustrated in FIG. 2B, the light irradiation control section 141 is implemented by the CPU 14A serving as a first processor reading and executing a light irradiation control program that is stored in the ROM 14B serving as a first memory or the storage 14D serving as a first memory. The light irradiation control section 141 is capable of controlling the light distribution of the headlamp 12 based on the detection result from the camera unit 22. In the present exemplary embodiment, in a case in which the camera unit 22 determines that the detected target is a target object for which the amount of light received from the headlamp 12 should be reduced, the light irradiation control section 141 controls the light distribution of the high beam lamp 12H of the headlamp 12 so as to cause the light irradiation region in which the target object is present to be dimmed.

Supplementary explanation follows regarding dimming. In the present exemplary embodiment, as an example, plural non-illustrated movable light shielding members are provided at a front side of the high beam lamp 12H of the headlamp 12 illustrated in FIG. 1, and the configuration is such that light irradiated from the high beam lamp 12H can be shielded by operation of the light shielding members. Further, the operation of each of the plural light blocking members is controlled by the lamp ECU 14. Namely, in the present exemplary embodiment, as an example, the dimming on the light irradiation region in which the target object is present is configured to have an amount of irradiated light of zero, and the dimming is implemented by the light blocking members blocking the light. Note that dimming of the light irradiation region in which the target object is present may be implemented by, for example, setting the amount of power applied to a specific light source among the plural light sources of the high beam lamp 12H to zero.

FIG. 3B is a block diagram illustrating an example of a functional configuration of the display control device 30. As illustrated in FIG. 3B, the display control device 30 includes an operation state determination section 301 and a display control section 302 as a functional configuration. Each functional configuration is implemented by the CPU 30A illustrated in FIG. 2A reading and executing a display control program stored in the ROM 30B or the storage 30D in the display control device 30.

The operation state determination section 301 illustrated in FIG. 3B determines whether or not the light irradiation control section 141 (see FIG. 3A) is in an active state. In other words, the operation state determination section 301 determines whether or not the AHS is in an active state.

The display control section 302 controls the display mode of the display device 32 so as to show the determination result of the operation state determination section 301, and also so as to show the light distribution control state by the light irradiation control section 141 (see FIG. 3A) in a case in which the light irradiation control section 141 is in an active state. Note that when the display control section 302 controls the display mode of the display device 32 so as to show the determination result of the operation state determination section 301, the display control device 30 determines which of the plural light sources of the indicator 32A to be turned on and which of the plural light sources of the indicator 32A to be turned off. Further, the display control device 30 acquires a light distribution control state performed according to the light irradiation control section 141 (see FIG. 3A) from the lamp ECU 14.

In the present exemplary embodiment, the display control section 302 controls so as to change the display mode of the display device 32 in accordance with whether or not the light irradiation control section 141 (see FIG. 3A) is controlling the light distribution of the high beam lamp 12H of the headlamp 12 so as to cause the light irradiation region in which the target object is present to be dimmed. Moreover, in the present exemplary embodiment, in a case in which the light irradiation control section 141 (see FIG. 3A) is controlling the light distribution of the high-beam lamp 12H of the headlamp 12 so as cause the light irradiation region in which the target object is present to be dimmed, the display control section 302 controls the display mode of the display device 32 so as to show a region that is irradiated with light by the high-beam lamp 12H of the headlamp 12 and that is not dimmed.

Next, explanation follows regarding operation of the vehicle headlight system 10. Note that a method of controlling the headlamp 12 by the lamp ECU 14 is not described below because well-known technology can be applied as described above, and therefore, a display control method of the vehicle headlight system 10 is described below.

FIG. 4 is a flowchart illustrating an example of a flow of display control processing performed by the display control device 30. The display control processing performed by the display control device 30 is performed by the CPU 30A reading a display control program from the ROM 30B or the storage 30D, and loading and executing the display control program in the RAM 30C. As an example, execution of the display control processing illustrated in FIG. 4 is started in a case in which a non-illustrated ignition switch is turned on.

The CPU 30A determines whether or not the AHS is in an active state (step S101). Note that the AHS enters an active state in a case in which there is no abnormality at the camera unit 22 or the illuminance sensor 24, the AHS switch is turned on at the switching unit 20, and the lamp switch is set in a predetermined state such as AUTO. The CPU 30A determines whether or not there is an abnormality at the camera unit 22 or the illuminance sensor 24, and determines whether or not the switching unit 20 is in the above-described state, thereby determining whether or not the AHS is in an active state.

In a case in which the AHS is not in an active state (step S101: N), the CPU 30A controls the display device 32 so as to adopt a display mode indicating that the AHS is in a non-active state, specifically, so as to bring the indicator 32A into the display mode illustrated in FIG. 5A (step S102), and transitions to the processing of step S108 illustrated in FIG. 4.

On the other hand, in a case in which an affirmative determination is made at step S101 (in other words, in a case in which the AHS is in an active state (step S101: Y)), the CPU 30A determines whether or not light irradiation (high beam light irradiation) by the high beam lamp 12H is being performed (step S103).

In a case in which light irradiation by the high beam lamp 12H is not being performed (step S103: N), the CPU 30A controls the display device 32 so as to adopt a display mode indicating a state in which light irradiation by the low beam lamp 12L (low beam light irradiation) is being performed (step S104). At step S104, the CPU 30A controls the display device 32 so that the indicator 32A is in the display mode illustrated in FIG. 5B, and controls the display device 32 so as to be in the display mode illustrated in FIG. 6B in the MID 32B. After executing the processing of step S104 illustrated in FIG. 4, the CPU 30A transitions to the processing of step S108.

On the other hand, in a case in which an affirmative determination is made at step S103 (in other words, in the case of a state in which light irradiation by the high beam lamp 12H is being performed (step S103: Y)), the CPU 30A determines whether or not whether or not a portion of the light irradiation region is being dimmed by the high beam lamp 12H (step S105).

In the case of a state in which dimming is not being performed on a portion of the light irradiation region by the high beam lamp 12H (step S105: N), the CPU 30A controls the display device 32 so as to adopt a display mode indicating a state in which dimming is not being performed on a portion of the light irradiation region by the high beam lamp 12H (a so-called a full high beam state) (step S106). At step S106, the CPU 30A controls the display device 32 so that the indicator 32A is in the display mode illustrated in FIG. 5D, and controls the display device 32 so as to be in the display mode illustrated in FIG. 6G in the MID 32B. After executing the processing of step S106 illustrated in FIG. 4, the CPU 30A transitions to the processing of step S108.

On the other hand, in a case in which an affirmative determination is made at step S105 (in the case of a state in which dimming is being performed on a portion of the light irradiation region by the high beam lamp 12H (step S105: Y)), the CPU 30A controls the display device 32 so as to adopt a display mode indicating a state in which dimming is being performed on a portion of the light irradiation region by the high beam lamp 12H (here, a so-called light-shielding high beam state) (step S107). At step S107, the CPU 30A controls the display device 32 so that the indicator 32A adopts the display mode illustrated in FIG. 5C, and controls the display of the display device 32 so as to adopt a display mode in which the region in which dimming is being performed, as an example, as illustrated in FIG. 6H, in the MID 32B is understood. After executing the processing of step S107 illustrated in FIG. 4, the CPU 30A transitions to the processing of step S108.

At step S108, based on, for example, whether or not the ignition switch of the host vehicle has been turned off, the CPU 30A determines whether or not driving of the host vehicle has ended. In a case in which it is determined that driving of the host vehicle has not ended (step S108: N), the CPU 30A repeats the processing from step S101. In a case in which it is determined that driving of the host vehicle has ended (step S108: Y), the CPU 30A ends the display control processing illustrated in FIG. 4.

As described above, the present exemplary embodiment enables a user to accurately understand a light distribution control state. This enables a user to correctly understand whether or not the vehicle headlight system 10 is appropriately controlling light distribution from the point of view of not causing glare to other vehicles. As a result, the user can take appropriate measures based on such correct understanding.

Note that in the above-described exemplary embodiment, in a case in which the light irradiation control section 141 (see FIG. 3A) is controlling the light distribution of the high beam lamp 12H of the headlamp 12 so as to cause the light irradiation region in which the target object is present to be dimmed, the display control section 302 illustrated in FIG. 3B controls the display mode of the display device 32 so as to show the region in which the light is irradiated by the high beam lamp 12H of the headlamp 12 and dimming is not being performed; however, as a modified example of the above-described exemplary embodiment, in a case in which a light irradiation control section (141) is controlling the light distribution of a high beam lamp (12H) of a headlamp (12) so as to cause the light irradiation region in which the target object is present to be dimmed, a display control section (30) may control the display mode of a display device (32) so as to show the region in which the dimming is being performed. Supplementary explanation follows referring back to FIG. 6D. For example, in a case in which the region in which the dimming is being performed is a center-side right region of the light irradiation region of the high beam lamp 12H, the MID 32B may be caused to display as illustrated in FIG. 6D. In this case, words specifying that the portion indicated by the dots is a region in which dimming is being performed may be also displayed.

Moreover, in the above-described exemplary embodiment, although the lamp ECU 14 illustrated in FIG. 1 is capable of executing control to dim a partial region during light distribution control of the high beam lamp 12H of the headlamp 12, as a modified example of the above-described exemplary embodiment, a lamp ECU (14) may be capable of executing control to brighten a partial region during light distribution control of a high beam lamp (12H) of a headlamp (12).

Further, in the above-described exemplary embodiment, although the dimming performed on the light irradiation region in which the target object is present is performed so as to cause the amount of irradiated light to the region to be zero, the dimming may be performed so as to reduce the amount of irradiated light to the region, but not to reach zero. Such a modified example can be implemented, for example, by reducing the amount of power supplied to a specific light source from among the plural light sources of a high beam lamp (12 H) but not setting the amount to zero.

Furthermore, although in the above-described exemplary embodiment, the lamp ECU 14 is capable of controlling the light distribution of the high beam lamp 12H, as a modified example, a lamp ECU (14) may be configured so as to be capable of controlling the light distribution of a high beam lamp (12H) and also capable of controlling the light distribution of a low beam lamp (12L).

Moreover, in the above-described exemplary embodiment, the display control device 30 illustrated in FIG. 1, FIG. 2A, and FIG. 3B executes control of the display mode using the indicator 32A illustrated in FIG. 5A to FIG. 5D, and control of the display mode using the MID 32B illustrated in FIG. 6A to FIG. 6H; however, as a modified example of the above-described exemplary embodiment, a display control device (30) may, for example, execute control of the display mode using an indicator (32A (see FIG. 5A to FIG. 5D), but not control of the display mode using a MID (32B (see FIG. 6A to FIG. 6H).

Further, although the indicator 32A and the MID 32B configuring the display device 32 are adopted as the display in the above-described exemplary embodiment, the display may be another display such as a head-up display, a car navigation screen, or the like.

Note that the vehicle headlight system 10 according to the above-described exemplary embodiment is also applicable to a vehicle that is capable of autonomous driving.

Further, any of various types of processors other than a CPU may execute each processing that the CPU 30A illustrated in FIG. 2A and the CPU 14A illustrated in FIG. 2B in the above-described exemplary embodiment executes by reading software (programs). Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, each processing may be executed by one of these various types of processors, or may be executed by combining two or more of the same type or different types of processors (e.g., plural FPGAs, or a combination of a CPU and an FPGA, or the like). Further, a hardware configuration of the various processors is specifically formed as an electric circuit combining circuit elements such as semiconductor elements.

In addition, the display control program described in the above-described exemplary embodiment may be provided in a format stored on a non-transitory storage medium such as compact disc read only memory (CD-ROM), digital versatile disc read only memory (DVD-ROM), or universal serial bus (USB) memory. Alternatively, the programs may be provided in a format downloadable from an external device via a network.

Note that the above-described exemplary embodiment and the above-described plural modified examples may be implemented in appropriate combinations.

Although an example of the present disclosure has been described above, the present disclosure is not limited to the above descriptions, and obviously various other modifications may the implemented within a range that does not depart from the gist of the present disclosure.

What is claimed is:

1. A vehicle headlight system comprising:
a headlight that irradiates light in front of a host vehicle;
a target detection section that is configured to detect a target present in front of the host vehicle;
a display that is provided inside a vehicle cabin of the host vehicle;
a first memory;
a first processor that is coupled to the first memory;
a second memory; and
a second processor that is coupled to the second memory,
wherein:
the first processor includes a light irradiation control function that is configured to control light distribution of the headlight, based on a detection result by the target detection section, and
the second processor is configured to determine whether or not the light irradiation control function is in an active state, to control a display mode of the display so as to show a determination result, and in a case in which the light irradiation control function is in the active state, to control the display mode of the display so as to show, in addition to the determination result, a light distribution control state according to the light irradiation control function.

2. The vehicle headlight system according to claim 1, wherein:
in a case in which the first processor determines that the target is a target object for which an amount of light received from the headlight should be reduced, the first processor is configured to control light distribution of the headlight so as to cause a light irradiation region in which the target object is present to be dimmed; and
the second processor is configured to control the display mode of the display to change in accordance with whether or not the first processor is controlling light distribution of the headlight so as to cause the light irradiation region in which the target object is present to be dimmed.

3. The vehicle headlight system according to claim 2, wherein:
in a case in which the first processor is controlling light distribution of the headlight so as to cause the light irradiation region in which the target object is present to be dimmed, the second processor is configured to control the display mode of the display so as to show the region in which light is dimmed or show a region that is irradiated with light by the headlight and that is not dimmed.

4. A display control method for a vehicle headlight system that comprises:
a headlight that irradiates light in front of a host vehicle;
a target detection section that detects a target present in front of the host vehicle;
a display that is provided inside a vehicle cabin of the host vehicle;
a first memory;
a first processor that is coupled to the first memory and that includes a light irradiation control function that is configured to control light distribution of the headlight, based on a detection result by the target detection section;
a second memory; and
a second processor that is coupled to the second memory,
the method comprising, by the second processor, determining whether or not the light irradiation control function is in an active state, controlling a display mode of the display so as to show a determination result, and in a case in which the light irradiation control function is in the active state, controlling the display mode of the display so as to show, in addition to the determination result, a light distribution control state according to the light irradiation control function.

5. A non-transitory storage medium storing a program that is executable by a second processor to perform display control processing in a vehicle headlight system that comprises a headlight that irradiates light in front of a host vehicle;

a target detection section that detects a target present in front of the host vehicle;

a display that is provided inside a vehicle cabin of the host vehicle;

a first memory;

a first processor that is coupled to the first memory and that includes a light irradiation control function that is configured to control light distribution of the headlight, based on a detection result by the target detection section;

a second memory; and the second processor that is coupled to the second memory, the display control processing comprising determining whether or not the light irradiation control function is in an active state, controlling a display mode of the display so as to show a determination result, and in a case in which the light irradiation control function is in the active state, controlling the display mode of the display so as to show, in addition to the determination result, a light distribution control state according to the light irradiation control function.

\* \* \* \* \*